(12) United States Patent
Ilstad et al.

(10) Patent No.: US 11,867,322 B2
(45) Date of Patent: Jan. 9, 2024

(54) DIRECT TIE-IN OF SUBSEA CONDUITS AND STRUCTURES

(71) Applicant: Equinor Energy AS, Stavanger (NO)

(72) Inventors: Håvar Ilstad, Trondheim (NO); Erik Levold, Trondheim (NO); Geir Endal, Jessheim (NO); Kjell Einar Ellingsen, Tananger (NO); Bjørgulf Haukelidsæter Eidesen, Stavanger (NO)

(73) Assignee: Equinor Energy AS, Stavanger (NO)

( * ) Notice: Subject to any disclaimer, the term of this patent is extended or adjusted under 35 U.S.C. 154(b) by 229 days.

(21) Appl. No.: 17/612,678

(22) PCT Filed: May 20, 2020

(86) PCT No.: PCT/NO2020/050134
§ 371 (c)(1),
(2) Date: Nov. 19, 2021

(87) PCT Pub. No.: WO2020/236011
PCT Pub. Date: Nov. 26, 2020

(65) Prior Publication Data
US 2022/0221083 A1    Jul. 14, 2022

(30) Foreign Application Priority Data
May 20, 2019  (GB) ...................... 1907104

(51) Int. Cl.
*F16L 1/26*    (2006.01)
*E21B 43/01*   (2006.01)
(Continued)

(52) U.S. Cl.
CPC ............ *F16L 1/26* (2013.01); *E21B 43/0107* (2013.01); *E21B 43/0135* (2013.01); *F16L 1/165* (2013.01); *F16L 1/23* (2013.01)

(58) Field of Classification Search
CPC ..... F16L 1/26; F16L 1/165; F16L 1/23; E21B 43/0107; E21B 43/0135; E21B 43/013
See application file for complete search history.

(56) References Cited

U.S. PATENT DOCUMENTS 3,378,066 A    4/1968  Otteman et al.
3,434,296 A    3/1969  Geer
(Continued)

FOREIGN PATENT DOCUMENTS

EA    200800287 A1    6/2008
EA     023126 B1      4/2016
(Continued)

OTHER PUBLICATIONS

Nov. 9, 2020—U.S. Office Action U.S. Appl. No. 16/955,570.
(Continued)

*Primary Examiner* — Janine M Kreck
(74) *Attorney, Agent, or Firm* — Banner & Witcoff, Ltd.

(57) ABSTRACT

A method of connecting a conduit to a subsea structure is provided. In the disclosed method, a tensioning member is provided on the conduit and attached to the conduit at two locations proximate a first end of the conduit. The tensioning member is used to maintain a curvature formed in the conduit between the two locations e.g. by deflecting a portion of the conduit. A first end of the conduit is engaged with a guide assembly provided adjacent to the subsea structure, and tension in the tensioning member is released to adjust the axial position of the first end of the conduit to enable direct connection between the conduit and the subsea structure. A method of disconnecting a conduit from a subsea structure, and a system for connecting a conduit to a subsea structure are also provided.

20 Claims, 3 Drawing Sheets

(51) Int. Cl.
*E21B 43/013* (2006.01)
*F16L 1/16* (2006.01)
*F16L 1/23* (2006.01)

(56) References Cited

U.S. PATENT DOCUMENTS

| | | | |
|---|---|---|---|
| 3,766,743 A | 10/1973 | Brown | |
| 3,965,713 A | 6/1976 | Horton | |
| 4,225,270 A * | 9/1980 | Dareing | E21B 43/0135 166/346 |
| 5,074,713 A | 12/1991 | Salvi dos Reis | |
| 5,320,175 A | 6/1994 | Ritter et al. | |
| 5,437,518 A | 8/1995 | Maloberti et al. | |
| 6,148,921 A | 11/2000 | Valla et al. | |
| 6,234,717 B1 | 5/2001 | Corbetta | |
| 7,600,569 B2 | 10/2009 | Routeau et al. | |
| 8,562,255 B2 | 10/2013 | Persson | |
| 8,936,413 B2 | 1/2015 | Mille et al. | |
| 9,068,675 B2 | 6/2015 | Mille et al. | |
| 2007/0081862 A1 | 4/2007 | Wolbers et al. | |
| 2010/0040417 A1 | 2/2010 | Bursaux et al. | |
| 2017/0108143 A1 * | 4/2017 | Moen | F16L 1/16 |

FOREIGN PATENT DOCUMENTS

| | | | |
|---|---|---|---|
| GB | 2477780 A | 8/2011 | |
| GB | 2509167 A | 6/2014 | |
| GB | 2535716 A | 8/2016 | |
| GB | 2545683 A | 6/2017 | |
| RU | 2229053 C2 | 5/2004 | |
| RU | 2381134 C2 | 2/2010 | |
| RU | 2583028 C2 | 4/2016 | |
| SU | 1161771 A1 | 6/1985 | |
| WO | 02057674 A1 | 7/2002 | |
| WO | 2015149843 A1 | 10/2015 | |
| WO | WO-2016137333 A1 * | 9/2016 | ............ E21B 43/01 |
| WO | 2017146582 A1 | 8/2017 | |
| WO | 2018111120 A1 | 6/2018 | |
| WO | 2019125174 A1 | 6/2019 | |

OTHER PUBLICATIONS

Mar. 1, 2020—U.S. Office Action U.S. Appl. No. 16/955,570.
Sep. 17, 2021—U.S. Office Action U.S. Appl. No. 16/955,570.
Jun. 11, 2021—U.S. Office Action U.S. Appl. No. 16/955,570.
Aug. 28, 2018—(WO) International Search Report and Written Opinion—APP PCT/NO2018/050162.
Apr. 23, 2018—(GB) Search Report—APP 1721777.9.
May 25, 2018—(GB) Search Report—APP 1721777.9.
Per R. Nystrøm et al., Lay Method to Allow for Direct Tie-in of Pipelines, International Society of Offshore and Polar Engineers, presented at the Twenty-fifth International Ocean and Polar Engineering Conference, Jun. 21-26, 2015, Kona, Hawaii, USA.
Sep. 7, 2021 (RU)—Office Action & Search Report Application No. 2020124108/03(041628).
Jul. 3, 2020—(WO) International Search Report and Written Opinion—App PCT/NO2020/050134.
Oct. 15, 2019—(GB) Combined Search and Exam Report—APP 1907104.2.
Dec. 9, 2019—(GB) Search Report—APP 1907104.2.
Dec. 10, 2019—(GB) Search Report—APP 1907104.2.

* cited by examiner

DIRECT TIE-IN OF SUBSEA CONDUITS AND STRUCTURES

The present application claims priority from and is a U.S. National Phase of International Application No. PCT/NO2020/050134, which was filed on May 20, 2020, designating the United States of America and claiming priority to United Kingdom Patent Application No. 1907104.2, filed on May 20, 2019. This application claims priority to and the benefit of the above-identified applications, which are all fully incorporated by reference herein in their entireties.

The invention relates to a method of connecting a conduit to a subsea structure. The invention also relates to a method of disconnecting a conduit from a subsea structure. In particular, the invention relates to methods of connecting and disconnecting subsea pipelines, such as hydrocarbon pipelines used in the oil and gas industry, to and from a subsea structure.

Pipelines for an oil and gas subsea installation, such as those used for the transport of hydrocarbons, e.g. oil or gas, are typically laid along the seabed between subsea structures using a pipeline-laying vessel at the surface. Each subsea structure will typically comprise one or more "Xmas trees" (or riser bases or Blow-Out Preventers (BOPs)) each mounted on a well head, with a manifold typically provided between the Xmas trees and the pipeline.

Often, one or both ends of the pipeline are connected (or "tied-in") to a manifold of the subsea structure using a separate jumper or spool. The spools may be rigid or flexible and are designed to take up installation tolerances, tie-in forces and pipeline expansion. For example, rigid spools may be arranged in an L- or Z-shaped formation which inherently provides a degree of flexibility because the L or Z shape is able to deform to some extent. However, this results in a complex structure. Moreover, it is necessary to perform detailed measurements of the pipeline/subsea structure system in order to produce a spool of the required dimensions. This leads to a complex and time consuming process. Instead, flexible spools, jumpers or tails may be used, however these are known to have a reduced lifetime compared to rigid spool systems.

Alternatively, direct tie-in methods (without a jumper or spool) can also be used. These methods include:

- Direct pull-in, in which an end of the pipeline is pulled close to the subsea structure using a winch location on the pipeline-laying vessel, and the tie-in is completed using a remotely operated vehicle (ROV) and alignment apparatus;
- Deflect to connect, wherein the pipe is pulled to a target area in line with the platform but to one side of it, then the connection is made by winding or otherwise deflecting the pipe laterally until it mates with the riser connection; and
- Connect and lay-away, in which the subsea end of the pipeline is connected to the subsea structure at the surface, and the subsea structure is then lowered to the seabed before the pipeline-laying vessel lays the pipeline by stepping away from the subsea structure.

However, all of these methods of connecting a pipeline to a subsea structure require considerable time, effort and cost, with many underwater connections to be made. The extra components and procedures associated with the use of separate jumpers or spools in particular can result in high costs for the installation process. For example, a number of lifting procedures may be required where a spool is used: firstly, a lift to install the foundation structure, secondly, a lift to install the manifold and thirdly, a lift to install the spool. The spool then needs to be connected to the manifold by an ROV connection process.

Further, even where direct tie-in methods are used, it can be difficult to correctly position the end of the pipeline for direct connection to the subsea structure. GB 2545683 discusses a direct tie-in method that attempts to address this problem. In this method, the end of a pipeline is first lowered into a removable channel arranged on top of a subsea structure before being pulled along the channel by applying tension to a wire tensioner attached to the pipeline. As the tension in the wire tensioner is increased, the end of the pipeline moves along the channel towards the end of the channel until it falls out of the channel and into a cradle arranged below the channel adjacent to the connector on the subsea structure to which the pipeline is to be directly connected. Once the end of the pipe is held in the cradle, the tension in the wire tensioner is released and a pull tool is used to perform the final pull-in and connection of the pipe to the subsea structure.

This method relies on the end of the pipeline falling under gravity into the cradle as it is pulled out from the channel on top of the subsea structure. If the end of the pipeline misses the cradle, it will fall beyond the intended position and make direct tie-in impossible without realignment. Also, the presence of the cradle prevents the pipeline from being easily disconnected from the subsea structure e.g. during maintenance or replacement of the subsea structure. Further, even where a direct tie-in method is used to connect a first end of a pipeline to a subsea structure, it can be necessary to use a spool to connect the second end of the pipeline to additional infrastructure (subsea or otherwise) in order to account for pipeline expansion. During use, pipelines can experience large axial forces and expansion caused by the pressure and temperature of the fluid flowing through the pipeline. If both ends of the pipeline are directly connected to infrastructure, the axial forces experienced by the pipeline can be transferred to the infrastructure. The spool is required to accommodate these forces by deforming and flexing (as discussed above) which otherwise may cause damage to the pipeline and/or the infrastructure.

Viewed from a first aspect, the invention provides a method of connecting a conduit to a subsea structure comprising: providing a tensioning member on the conduit, the tensioning member being attached to the conduit at two locations proximate a first end of the conduit; deflecting a portion of the conduit to form a curvature in the conduit between the two locations; maintaining the curvature in the conduit between the two locations with the tensioning member; providing a guide assembly adjacent to the subsea structure; engaging the first end of the conduit with the guide assembly; and releasing tension in the tensioning member to adjust the axial position of the first end of the conduit to enable direct connection between the conduit and the subsea structure.

This method greatly simplifies the connection process. By introducing a degree of curvature into the conduit, the axial position of the end of the conduit relative to the subsea structure can be readily adjusted by the tensioning member. By adjusting the tension in the tensioning member, the radius of curvature in the conduit can be manipulated to enable axial adjustment of the conduit at the sea bed. Moreover, the guide assembly, which may conveniently be located on the sea bed, enables the end of the conduit to be aligned with a port on the subsea structure, i.e. the end of the conduit may be positioned vertically at the correct height and/or at the correct lateral position for engagement with a port on the subsea structure. Further, complex measurements needed to design and manufacture spools for connecting the conduit to the subsea structure may be avoided.

Once the first end of the conduit is engaged with guide assembly, the method may further comprise adjusting the guide assembly to vertically and/or laterally align the end of the pipe with a port on the subsea structure before releasing tension in the tensioning member.

This enables the end of the conduit to be positioned correctly for connection with the subsea structure. By providing an adjustable guide assembly, less accuracy is required when positioning the guide assembly on the sea bed adjacent the subsea structure. Additionally, the position of the end of the conduit can be altered in situ on the sea bed to account for any relative displacement between the guide assembly and the subsea structure that may have occurred after the guide assembly was positioned on the sea bed.

The method may further comprise locking the guide assembly in position to prevent movement of the first end of the conduit once the first end of the conduit has been engaged with the guide assembly.

It will be appreciated that locking of the guide assembly may occur after any necessary vertical and/or lateral adjustment of the guide assembly has been made to position the first end of the conduit. Locking the guide assembly in place acts to maintain the positioning of the first end of the conduit, therefore ensuring that the vertical and/or lateral positioning of the end of the conduit is maintained during subsequent axial adjustment.

Once tension in the tensioning member has been released to axially adjust the position of the end of the conduit, the method may further comprise fluidly coupling the end of the conduit to the subsea structure.

Fluid coupling may be performed remotely, for example via a remotely operated underwater vehicle. Alternatively, divers may be used to fluidly couple the first end of the conduit to the subsea structure. The step of fluidly coupling may comprise connecting a flange at the first end of the conduit to a flange on the subsea structure, for example with bolts.

The tensioning member may be operated remotely by a remotely operated underwater vehicle, or via an umbilical (e.g. connected to a pipe-laying vessel and operated therefrom).

Once the conduit and the subsea structure have been fluidly coupled, the guide assembly may be maintained in place.

In this way, in the preferred arrangement in which the guide assembly is location on the sea bed, any axial forces experienced by the conduit, for example caused by the pressure and temperature of the fluid flowing through the conduit, are transferred to the guide assembly and prevented from propagating to the subsea structure. Thus, the subsea structure is protected from these forces and damage to the subsea structure can be prevented.

Alternatively, the guide assembly may be removed after the conduit has been fluidly coupled to the subsea structure.

The guide assembly may comprise guide posts for engaging with the first end of the conduit.

The guide posts can be used to guide the first end of the conduit into the correct location as it is lowered and/or during subsequent adjustment of the guide assembly. Accordingly, the step of engaging the first end of the conduit with the guide assembly may comprise laying the first end of the conduit between the guide posts.

The guide assembly may comprise a foundation to secure the guide assembly to the seabed. This may be any suitable form of foundation, such as a suction anchor.

To enable vertical and/or horizontal positioning of the end of the conduit on the sea bed, the guide assembly may comprise a landing surface that is moveable vertically and horizontally relative to the foundation.

Adjustment of the guide assembly may be performed remotely by a remotely operated underwater vehicle or via an umbilical (e.g. connected to a pipe-laying vessel and operated therefrom).

It will be appreciated that the invention is particularly applicable to hydrocarbon extraction and so the conduit may be a subsea pipeline, preferably for such a purpose. Likewise, the subsea structure preferably comprises a wellhead, manifold and/or pump to which the end of the conduit may be connected.

The tensioning member may be any convenient tensioner capable of maintaining and adjusting tension in the conduit, but a wire tensioning system is particularly suitable.

Viewed from a second aspect, the invention provides a method of disconnecting a conduit from a subsea structure comprising: providing a tensioning member on the conduit, the tensioning member being attached to the conduit at two locations proximate a first end of the conduit; uncoupling the first end of the conduit from the subsea structure; and tensioning the tensioning member to deflect a portion of the conduit and pull the first end of the conduit away from the subsea structure.

This aspect of the invention is preferably performed in combination with any of the previously described preferred features of the invention.

Disconnection may be desired, for example, if maintenance and/or replacement of the subsea structure is required. It is common for maintenance of subsea structures to be carried out at regular service intervals, so the method advantageously provides a simple repeatable process for disconnecting a conduit from a subsea structure. The conduit may be reconnected to the subsea structure by releasing tension in the tensioning member to adjust the axial position of the first end of the conduit towards the subsea structure.

The method may further comprise providing a guide assembly (preferably located on the seabed) that is engaged with the first end of the conduit. The guide assembly can be used to control the positioning of first end of the conduit once the conduit and the subsea structure have been decoupled.

Once the first end of the conduit has been pulled away from the subsea structure, the guide assembly may be adjusted to alter the lateral and/or vertical position of the end of the conduit to move the end of the conduit further away from the subsea structure.

Advantageously, by moving adjusting the guide assembly a greater distance can be provided between the first end of the conduit and the subsea structure, allowing more room to carry out maintenance and/or replacement of the subsea structure.

Adjustment of the guide assembly may performed by remotely by a remotely operated underwater vehicle or via an umbilical (e.g. connected to a pipe-laying vessel and operated therefrom).

The step of decoupling may be performed remotely, for example via a remotely operated underwater vehicle. Alternatively, divers may be used to decouple the first end of the conduit from the subsea structure.

The tensioning member may be operated remotely by a remotely operated underwater vehicle, or via an umbilical (e.g. connected to a pipe-laying vessel and operated therefrom).

The invention also extends to a corresponding system. Thus, according to a further aspect of the invention there is provided a system for connecting a conduit to a subsea structure comprising: a tensioning member for attachment to the conduit at two locations proximate a first end of the conduit whereby it may deflect a portion of the conduit to form or control a curvature in the conduit between the two locations and thereby move the first end of the conduit; and a guide assembly for location adjacent to the subsea structure and being engagable with the first end of the conduit whereby it may guide the first end of the conduit relative to the subsea structure as the conduit is moved using the tensioning member into or out of connection with the subsea structure.

This system enables the first end of the conduit to be positioned relative to the subsea structure. The tensioning member enables a portion of the conduit to be deflected to form or control a curvature in the conduit between the two locations, thereby facilitating movement of the first end of the conduit. The guide assembly enables the first end of the conduit to be guided relative to the subsea structure as the conduit is moved using the tensioning member.

The system may further comprise a conduit to which the tensioning member is attached at two locations proximate a first end thereof and a subsea structure to which the conduit may be connected or disconnected.

The system is preferably adapted for use in the methods of the invention described above, and in particular the preferred forms thereof and may be provided with features such as those described in the embodiment discussed below.

An embodiment of the invention will now be described, by way of example only, with reference to the following figures, in which.

Where "pipeline" is referred to in the embodiments described below, it is meant a pipeline known to those skilled in this technical field as a "rigid pipeline". Such a rigid pipeline 10 typically comprises an external sheath of insulation having a corrosion resistant coating, surrounding a product pipe. The product pipe is generally a metal pipe, typically of stainless steel or carbon steel. Such rigid pipelines are typically manufactured in 12 m sections (pipe lengths), which are welded together. Although such pipelines are known as rigid pipelines, the skilled person would well appreciate that they are not entirely rigid. They will generally have a small amount of elastic flexibility, so that they can flex a certain amount (as will be discussed below), but if pushed to flex beyond this then the pipeline would be damaged, e.g. it may kink or fracture.

Such a rigid pipeline is to be contrasted with pipelines known as flexible pipelines. These typically comprise a number of flexible layers. These may comprise an outer corrosion resistant sheath, various armoured layers and insulating layers, whilst the innermost layer will comprise a carcass, typically of stainless steel. Each of these layers has a degree of flexibility so that the entire pipeline is flexible. The flexible layers may e.g. be corrugated or spiral formed, to provide the flexibility. It will be well appreciated that such a flexible pipeline is much more complex than the rigid pipeline since the multiple layers are required to provide the flexibility. Thus, flexible pipeline is much more expensive and complex to manufacture. It is also less strong and less robust that rigid pipeline, has more leak points, and is less resistant to ageing, temperature and pressure. It has to be manufactured at its complete length, it cannot be made in sections and welded together in the way that rigid pipelines can be. Flexible pipelines may also be called hoses.

Consequently, rigid pipelines are much preferred in embodiments of the present application, but flexible pipelines may be employed.

FIGS. 1-8 relate to a method of connecting a subsea pipeline 10 to a subsea structure 20, which may be performed according to the invention.

Figure 1:
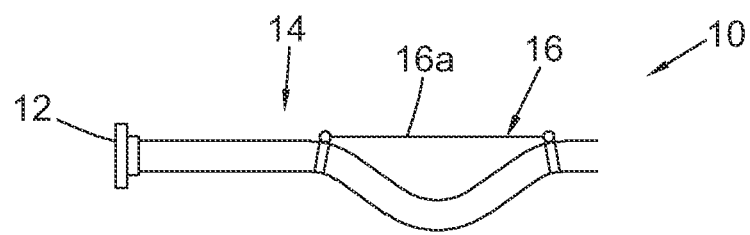
FIG. 1 is a view of a first end of a pipeline having a wire tensioning system installed thereon.

Referring to FIG. 1, a pipeline 10 is provided having a connection flange 12 at its first end 14 and a wire tensioning system 16 attached to the pipeline 10 adjacent the first end 14. The wire tensioning system 16 comprises a wire 16*a* with a first end connected to the pipeline 10 at a first location and a second end connected to the pipeline 10 at a second location. The tension in the wire 16*a* can be increased or decreased in order to deflect the pipeline 10. For example, if tension in the wire is increased the pipeline 10 will be deflected and a curvature will be introduced into the pipeline 10 between the first and second locations. Releasing or reducing tension in the wire will cause the pipeline 10 to relax, reducing the curvature in the pipeline 10. The wire 16*a* can also be used to maintain a curvature in the pipeline 10 that has been introduced by other means, for example by a pipe straightener whilst the pipeline 10 is being deployed from a pipeline-laying vessel (shown in FIG. 4).

Figure 2:
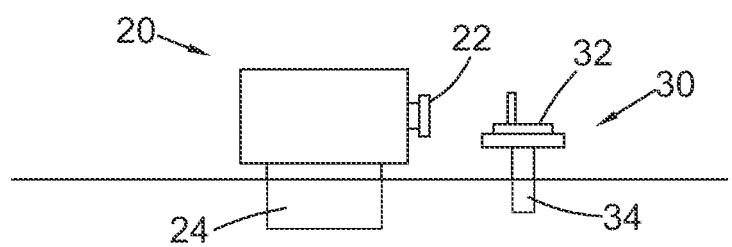
FIG. 2 illustrates a subsea structure and a guide assembly on the sea bed.

With reference to FIG. 2, a subsea structure 20 is mounted on a foundation 24 secured to the sea bed. The subsea structure 20 is provided with a connection flange 22 to facilitate direct fluid connection with the pipeline 10 through engagement with the connection flange 12 of the pipeline 10.

In this embodiment the foundation 24 is in the form of two suction anchors on which the subsea structure 20 is mounted, but in other embodiments the foundation 24 may be a mudmat or a piled arrangement.

A guide assembly 30 is secured to the seabed adjacent to the subsea structure 20. The guide assembly 30 comprises a landing surface 32 and a foundation 34 on which the landing surface 32 is moveably attached. In this embodiment, the foundation 34 is in the form of a suction anchor.

Figure 3:
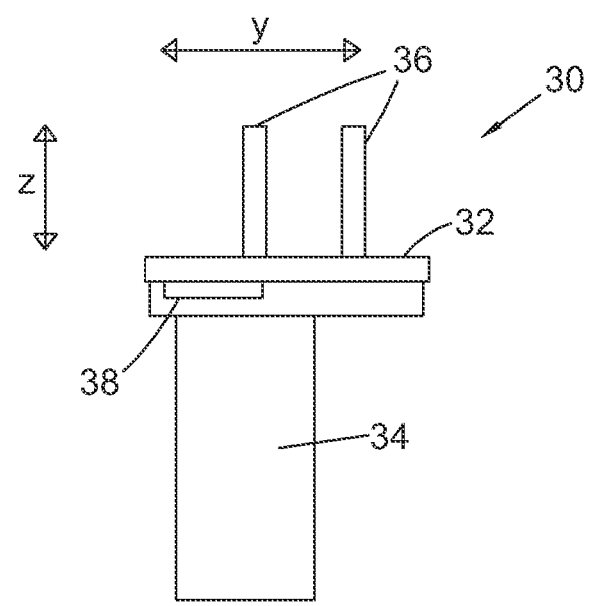
FIG. 3 is an elevation view of a guide assembly.

The guide assembly 30 is shown in FIG. 3. The landing surface 32 is attached to the foundation 34 so that it can be moved laterally and vertically relative to the foundation 34, as shown by arrows Y and Z in FIG. 3. The guide assembly 30 is provided with actuators to enable lateral adjustment of the landing surface 32 and jacks 38 to enable vertical adjustment. Since the landing surface 32 can be moved laterally and vertically relative to the foundation 34, the guide assembly 30 can be used to manoeuvre and position the end 14 of the pipeline 10. Accordingly, the guide structure can be operated to help move the end 14 of the pipeline 10 into a position to allow direct connection of the pipeline 10 to the subsea structure 20.

Two guide posts 36 are provided on the landing surface 32 to facilitate engagement of the pipeline 10 with the guide assembly 30. The guide posts 36 help to guide and position the pipeline 10 relative to the subsea structure 20.

FIGS. 4-8 show the steps involved in laying a pipeline 10 and connecting an end 14 of the pipeline 10 to a subsea structure 20.

Figure 4:
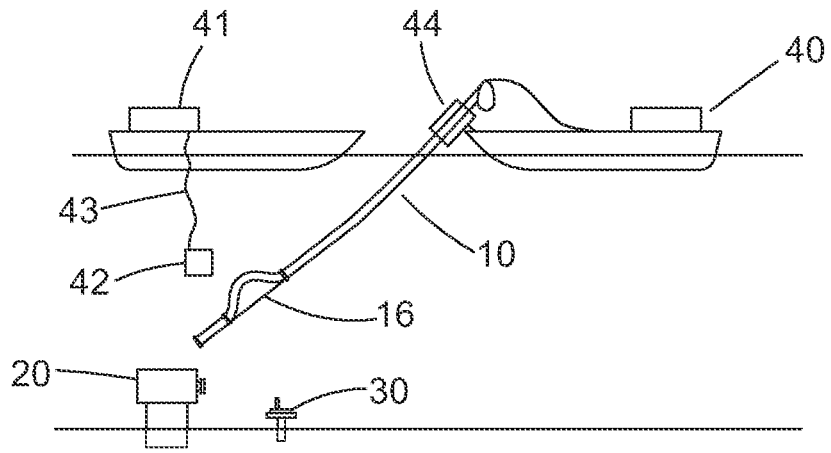
FIGS. 4 and 5 are schematic illustrations showing a series of steps whereby a pipeline is connected with to a subsea structure.

With reference to FIG. 4, a conventional pipeline-laying vessel 40 is accompanied by an ROV-operating vessel 41 as it lays the pipeline 10. An ROV 42 is attached to the ROV-operating vessel 41 by an umbilical 43. The pipeline-laying vessel 40 has a store of pipeline 10 on a reel. As the pipeline 10 is unwound from the reel, it passes over a wheel and then downwardly through a pipe straightener 44, in the well-known manner.

The pipeline 10 is lowered into the water from the pipeline-laying vessel 40, causing at least a portion of the pipeline 10, including the first end 14, to become submerged. The wire tensioning system 16 is adjusted by the ROV 42 to increase tension in the wire 16a, thereby causing the pipeline 10 to deflect. Hence, a curved portion is created in the pipeline 10. In this embodiment, the wire tensioning system 16 is actuated remotely underwater by an ROV 42, but the wire tensioning system 16 may alternatively be adjusted, for example, through an umbilical connected to the pipeline-laying vessel 40. In other embodiments, the wire tensioning system 16 may be actuated on the surface before submerging the pipeline 10 in the water.

It is also possible to introduce a curvature into the pipeline 10 as it is passed through the pipe straightener 44 on the pipeline-laying vessel 40.

As the pipeline 10 passes through the pipe straightener 44, it can be turned off at a desired interval so that it is not be used to straighten a section of the pipeline 10. Therefore, a section of the pipeline 10 is left with a residual curvature, i.e. it is not straightened. The wire tensioning system 16 can then be used to maintain and adjust this curvature in the pipeline 10.

Figure 5:
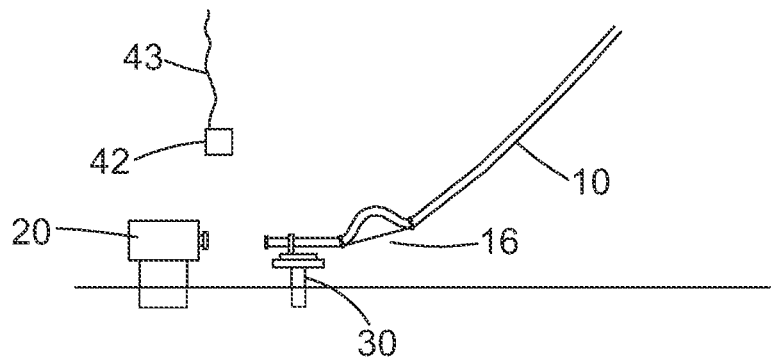

After the curved section has been introduced into the pipeline 10, the first end 14 of the pipeline 10 is lowered towards the seabed and onto the landing surface 32 of the guide assembly 30 so that it is held between the two guide posts 36, as shown in FIG. 5. The lateral and vertical position of the end 14 of the pipeline 10 is then altered by moving the landing surface 32 of the guide assembly 30. In this embodiment, the actuators and jacks 38 are adjusted by the ROV 42 in order to move the position of the landing surface 32 relative to the foundation 34. However, the actuators and jacks 38 could alternatively be controlled via an umbilical.

Figure 6:
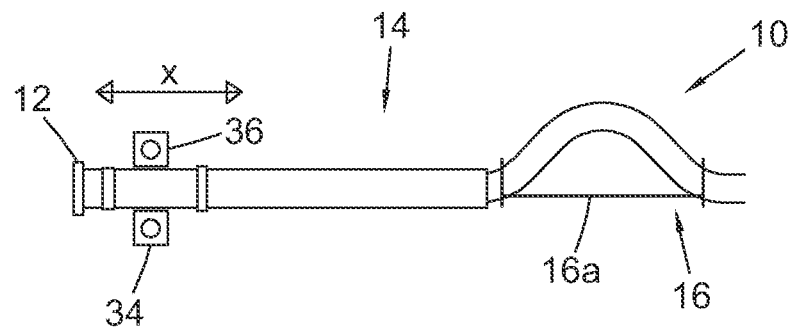
FIG. 6 is a schematic plan view showing an end of a pipeline engaged with a guide assembly on the sea bed.
Figure 7:
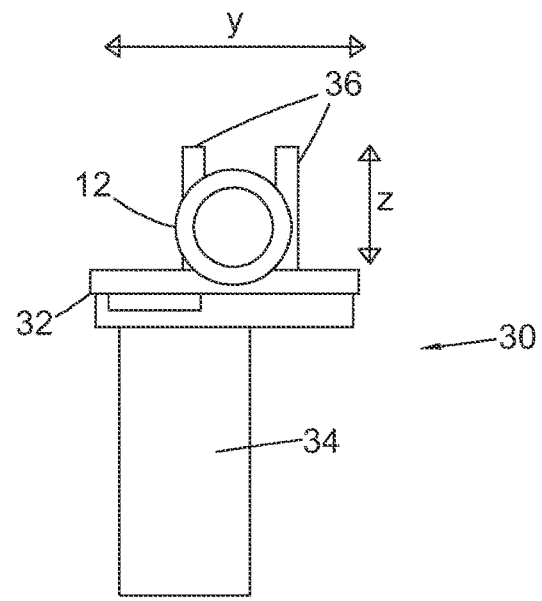
FIG. 7 is a schematic elevation view of an end of a pipeline engaged with a guide assembly on the sea bed.

When the connection flange 12 of the pipeline 10 is axially aligned with the connection flange 22 of the subsea structure 20, the actuators and jacks 38 are locked in position to maintain the alignment. The landing surface 32 and the guide posts 36 hold the pipeline 10 in this aligned position. FIGS. 6 and 7 show the pipeline 10 held in position by the guide assembly 30.

Once the pipeline 10 is locked in position, the wire tensioning system 16 is adjusted to release tension in the wire 16a. This causes the pipeline 10 to relax and the deflection of the pipeline 10 to be reduced, i.e. the pipeline curvature is reduced. The relaxation of the pipeline 10 and reduction in the curvature forces the end 14 of the pipeline 10 to move between the guide posts 36 axially towards the subsea structure 20 in direction X. Thus, the connection flange 12 moves towards the connection flange 22 of the subsea structure 20.

The axial movement of the end 14 of the pipeline 10 towards the subsea structure 20 is controlled by controlling the tension in the wire 16a. For instance, if initially there is a relatively large distance between flange 12 at the end 14 of the pipeline 10 and the subsea structure 20 then the tension in the wire 16a can be reduced a correspondingly large amount. Alternatively, if initially there is a relatively small distance between the flange 12 and the subsea structure 20 then a relatively small amount of tension can be released from the wire 16a in order to allow only a small axial movement of the end 14 of the pipeline 10. In this way, the axial displacement of the end 14 of the pipeline 10 can be controlled and customised depending on the specific arrangement and situation.

Figure 8:
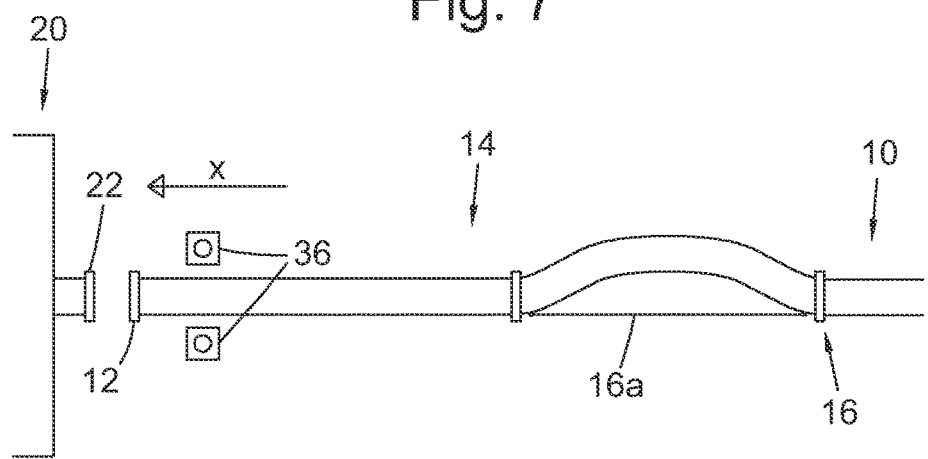
FIG. 8 is a schematic elevation view showing a step of moving an end of a pipeline axially towards a subsea structure.

It will be appreciated that it may not be necessary to release all of the tension in the wire 16a in order to bring the flanges 12, 22 together. For example, it may be sufficient to release only some of the tension in the wire 16a in order to bring the flanges 12, 22 close enough to facilitate direct connection therebetween. In such a case, a curved section may remain in the pipeline 10 even after connection of the pipeline 10 to the subsea structure 20. This can be seen in FIG. 8, showing a plan view of the pipeline 10 in position adjacent the subsea structure 20 after tension in the wire 16a has been released.

Once sufficient tension has been released from the wire 16a, a fluid connection between the pipeline 10 and the subsea structure 20 can be achieved in the conventional manner by coupling the flanges 12, 22 together. In this embodiment, the ROV 42 is used to bolt the flanges 12, 22 together, although divers can also be utilised to make this connection.

Once the pipeline 10 has been connected to the subsea structure 20, the guide assembly 30 may be maintained in position on the seabed with the pipeline 10 held by the guide posts 36 and locked in position relative to the guide assembly 30. In this way, the guide assembly 30 prevents propagation of any axial forces experienced by the pipeline 10, for example caused by the pressure and temperature of the fluid flowing through the pipeline 10, to the subsea structure 20. Instead, the axial forces are transferred to the guide assembly 30. Thus, the subsea structure 20 is protected from these forces and damage to the subsea structure 20 can be prevented.

The above method provides an improved method of connecting a pipeline 10 to a subsea structure 20 without the need for a spool to absorb axial forces experienced by the pipeline 10. By negating the need for a spool, there is no need to make detailed measurements for calculating the size of a unique spool and so the time needed to lay and connect the pipeline 10 is reduced. This method is also less complex than prior art methods, since subsea measurements are eliminated.

Figure 9:
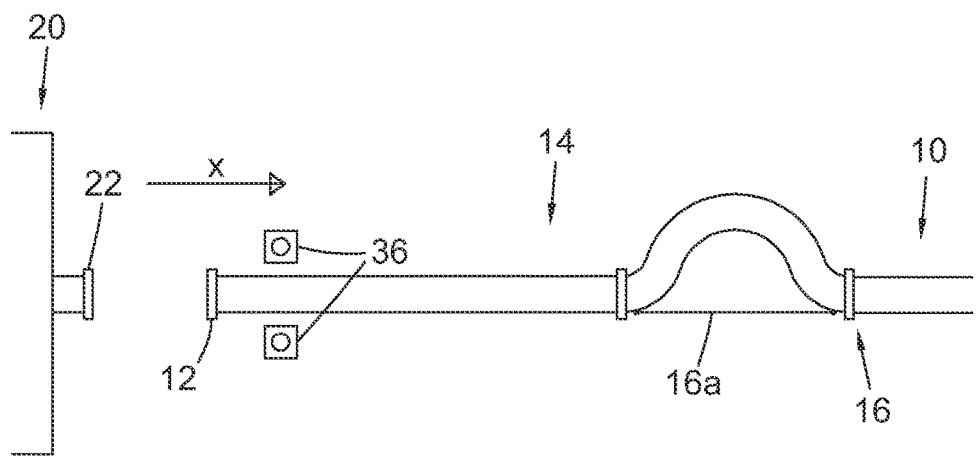
FIG. 9 is a schematic elevation view showing a step of moving an end of a pipeline axially away from a subsea structure.

A method of disconnecting a pipeline 10 from a subsea structure 20 will now be described with reference to FIG. 9. The apparatus used in this method is the same as used in the method described above for connecting a pipeline 10 to a subsea structure 20, and the same reference numbers will be used to refer to the corresponding features.

During the operational lifetime of the pipeline 10 and/or subsea structure 20 it may be required that the pipeline 10 is disconnected from a subsea structure 20. For example, it may be necessary to perform maintenance on the subsea structure 20 and/or replace the subsea structure 20 which necessitates disconnection of the pipeline 10 from the subsea structure 20. Such maintenance or replacement may be carried out regularly at predefined time intervals, or as necessary, for example if the subsea structure 20 is damaged.

To disconnect the pipeline 10 from the subsea structure 20, an ROV 42 is used to decouple to the flange 12 of the pipeline 10 from the flange 22 of the subsea structure 20. During this decoupling process the guide assembly 30 remains locked to ensure that no axial forces experienced by the pipeline 10 are transferred to the subsea structure 20.

Once the flanges 12, 22 are decoupled, the guide assembly 30 is unlocked to allow relative axial movement of the pipeline 10 relative to the subsea structure 20. The tensioning system 16 is then actuated to increase tension in the wire 16*a*. The increased tension in the wire 16*a* causes a bend in the pipeline 10 between the first and second locations on the pipeline 10 and pulls the end 14 of the pipeline 10 and the flange 12 axially away from the subsea structure 20.

The distance between the end 14 of the pipeline 10 and the subsea structure 20 can be altered by varying the amount of tension introduced into the wire 16*a*. By increasing the tension in the wire 16*a* by a relatively large extent, the pipeline 10 is forced to bend more and a greater distance can be achieved between the end 14 of the pipeline 10 and the subsea structure 20. Alternatively, if the tension is increased by a relatively small amount, the pipeline 10 is forced to bend less and the distance between the subsea structure 20 and the end 14 of the pipeline 10 is smaller. Thus, the distance can be controlled and customised depending on the requirements of the disconnection operation. For example, it may be necessary to move the end 14 of the pipeline 10 further from the subsea structure 20 when the subsea structure 20 is being replaced compared to when maintenance is being carried out on the subsea structure 20.

The position of the landing structure can also be altered if it is necessary to increase the displacement between the end 14 of the pipeline 10 and the subsea structure 20 further. Once the tensioning system 16 has been adjusted to move the end 14 of the pipeline 10 axially away from the subsea structure 20, the actuators and/or jacks 38 are adjusted to laterally and/or vertically displace the landing structure so that the end 14 of the pipeline 10 is correspondingly moved. This is beneficial if the end 14 of the pipeline 10 would otherwise obstruct access to the subsea structure 20, for example during maintenance or replacement thereof.

Once maintenance of the subsea structure 20 is complete, or the subsea structure 20 has been replaced, it is possible to reconnect the pipeline 10 to the subsea structure 20 by adjusting the guide assembly 30 and the wire tensioning system 16. The lateral and vertical positioning of the end 14 of the pipeline 10 can be altered by adjusting the guide assembly 30 as described above. The wire tensioning system 16 can then be adjusted to release tension in the wire 16*a*. As previously described, this causes the pipeline 10 to relax and the deflection of the pipeline 10 to be reduced. The end 14 of the pipeline 10 will therefore move towards the subsea structure 20. It is then possible to fluidly couple the pipeline 10 and the subsea structure 20.

It will be appreciated that the above method of provides a simple, repeatable and controllable process for disconnecting a pipeline 10 from a subsea structure 20.

The invention claimed is:

1. A method of connecting a conduit to a subsea structure comprising:

providing a tensioning member on the conduit, the tensioning member being attached to the conduit at two locations proximate a first end of the conduit;
deflecting a portion of the conduit to form a curvature in the conduit between the two locations;
maintaining the curvature in the conduit between the two locations with the tensioning member;
providing a guide assembly adjacent to the subsea structure;
engaging the first end of the conduit with the guide assembly; and
releasing tension in the tensioning member to adjust the axial position of the first end of the conduit to enable direct connection between the conduit and the subsea structure.

2. A method as claimed in claim 1, further comprising adjusting the guide assembly to vertically and/or laterally align the end of the pipe with a connector on the subsea structure before releasing tension in the tensioning member.

3. A method as claimed in claim 1, further comprising locking the guide assembly in position to prevent movement of the first end of the conduit.

4. A method as claimed in claim 1, further comprising fluidly coupling the end of the conduit to the subsea structure.

5. A method as claimed in claim 1, wherein the tensioning member is operated by a remotely operated underwater vehicle, an umbilical or remotely operated actuators.

6. A method as claimed in claim 1, wherein after tension is released from the tensioning member the guide assembly is maintained in place.

7. A method as claimed in claim 1, wherein the guide assembly comprises guide posts for engaging with the first end of the conduit.

8. A method as claimed in claim 7, wherein the step of engaging the first end of the conduit with the guide assembly comprises laying the first end of the conduit between the guide posts.

9. A method as claimed in claim 1, wherein the guide assembly comprises a foundation to secure the guide assembly to the seabed.

10. A method as claimed in claim 9, wherein the guide assembly comprises a landing surface moveable vertically and horizontally relative to the foundation.

11. A method as claimed in claim 1, wherein the conduit is a subsea pipeline.

12. A method as claimed in claim 1, wherein the subsea structure comprises a wellhead, a manifold or a pump.

13. A method as claimed in claim 1, wherein the tensioning member is a wire tensioning system.

14. A method of disconnecting a conduit from a subsea structure comprising:

providing a tensioning member on the conduit, the tensioning member being attached to the conduit at two locations proximate a first end of the conduit; and
tensioning the tensioning member to deflect a portion of the conduit and pull the first end of the conduit away from the subsea structure.

15. A method as claimed in claim 14, further comprising providing a guide assembly on the seabed that is engaged with the first end of the conduit.

16. A method as claimed in claim 15, further comprising adjusting the guide assembly to alter the lateral and/or vertical position of the end of the conduit to move the end of the conduit away from the subsea structure after the first end of the conduit is pulled away from the subsea structure.

17. A method as claimed in claim 14, further comprising decoupling the first end of the conduit from the subsea structure before pulling the first end of the conduit away from the subsea structure.

18. A method as claimed in claim 14, wherein the tensioning member is operated by a remotely operated underwater vehicle, an umbilical or remotely operated actuators.

19. A system for connecting a conduit to a subsea structure comprising:
- a tensioning member for attachment to the conduit at two locations proximate a first end of the conduit whereby it may deflect a portion of the conduit to form or control a curvature in the conduit between the two locations and thereby move the first end of the conduit; and
- a guide assembly for location adjacent to the subsea structure and being engagable with the first end of the conduit whereby it may guide the first end of the conduit relative to the subsea structure as the conduit is moved using the tensioning member into or out of connection with the subsea structure.

20. A system as claimed in claim 19, further comprising a conduit to which the tensioning member is attached at two locations proximate a first end thereof and a subsea structure to which the conduit may be connected or disconnected.

* * * * *